US012374767B2

(12) United States Patent
Kim et al.

(10) Patent No.: US 12,374,767 B2
(45) Date of Patent: Jul. 29, 2025

(54) INFORMATION HANDLING SYSTEM DOCKING STATION INCLUDING A CURRENT TRAPPER FOR INTRA-BAND, MULTI-RADIO ISOLATION

(71) Applicant: Dell Products L.P., Round Rock, TX (US)

(72) Inventors: Changsoo Kim, Cedar Park, TX (US); Lisa Asiedu, Round Rock, TX (US); Geroncio Ong Tan, Austin, TX (US); Ching Wei Chang, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 192 days.

(21) Appl. No.: 18/118,430

(22) Filed: Mar. 7, 2023

(65) Prior Publication Data

US 2024/0304971 A1   Sep. 12, 2024

(51) Int. Cl.
*H01P 1/36* (2006.01)
*G06F 1/16* (2006.01)
*H01Q 1/12* (2006.01)

(52) U.S. Cl.
CPC .............. *H01P 1/36* (2013.01); *G06F 1/1632* (2013.01); *H01Q 1/12* (2013.01)

(58) Field of Classification Search
CPC ............ H01P 1/36; G06F 1/1632; H01Q 1/12
See application file for complete search history.

(56) References Cited

U.S. PATENT DOCUMENTS

| 7,382,211 B2* | 6/2008 | Kishimoto | H01P 1/36 333/1.1 |
| 2004/0004521 A1* | 1/2004 | Hasegawa | H01P 1/36 333/1.1 |
| 2020/0225701 A1* | 7/2020 | Tsao | G06F 1/203 |

* cited by examiner

*Primary Examiner* — Daniel D Chang
(74) *Attorney, Agent, or Firm* — Terrile, Cannatti & Chambers, LLP; Stephen A. Terrile (57) ABSTRACT

An apparatus for performing a current trapper function. The apparatus includes: a short impedance structure; a first open impedance structure, the first open impedance structure being coupled between the short impedance structure and ground; and, a second open impedance structure, the second open impedance structure being coupled between the short impedance structure and ground, the short impedance structure being coupled between the first open impedance structure and the second open impedance structure. In certain embodiments, the apparatus is included within a multi radio docking station.

15 Claims, 9 Drawing Sheets

INFORMATION HANDLING SYSTEM DOCKING STATION INCLUDING A CURRENT TRAPPER FOR INTRA-BAND, MULTI-RADIO ISOLATION

BACKGROUND OF THE INVENTION

Field of the Invention

The present invention relates to information handling systems. More specifically, embodiments of the invention relate to intra-band, multi-radio isolation within an information handling system environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

An apparatus, system and docking station for providing a current trapper function for intra-band, multi-radio isolation.

More specifically, in one embodiment the invention relates to an apparatus for performing a current trapper function, comprising: a first open impedance structure, the first open impedance structure being coupled between the short impedance structure and ground; and, a second open impedance structure, the second open impedance structure being coupled between the short impedance structure and ground, the short impedance structure being coupled between the first open impedance structure and the second open impedance structure.

In another embodiment the invention relates to an antenna system comprising: a first antenna; a second antenna; and an antenna isolation component positioned proximate to one of the first antenna and the second antenna, the antenna isolation component performing a current trapper function, the antenna isolation component comprising: a first open impedance structure, the first open impedance structure being coupled between the short impedance structure and ground; and, a second open impedance structure, the second open impedance structure being coupled between the short impedance structure and ground, the short impedance structure being coupled between the first open impedance structure and the second open impedance structure.

In another embodiment the invention relates to a multi radio docking station comprising: a docking station housing; a first antenna positioned within the docking station housing; a second antenna positioned within the docking station housing; and an antenna isolation component positioned proximate to one of the first antenna and the second antenna, the antenna isolation component performing a current trapper function, the antenna isolation component comprising: a first open impedance structure, the first open impedance structure being coupled between the short impedance structure and ground; and, a second open impedance structure, the second open impedance structure being coupled between the short impedance structure and ground, the short impedance structure being coupled between the first open impedance structure and the second open impedance structure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Certain aspects of the disclosure reflect an appreciation that it may be desirable to provide a platform which includes multiple radios operating in the same band. With some of these platforms, their antennas may be positioned close to each other. Due to the asynchronous nature of these radios, it is possible that both radios could transmit and receive on the same frequency simultaneously. Certain aspects of the disclosure reflect an appreciation that in this situation, the transmitted signal from one radio could interfere with the receiver sensitivity on the other radio (or vice versa), which could cause one of the antennas to desense. As is known in the art, antenna desense is a degradation in antenna sensitivity due to a noise source, typically which is generated by the same device in which the antenna radio is located.

Accordingly, certain aspects of the disclosure reflect an appreciation that in a multiple radio platform, one radio in the platform may act as a noise source for another radio in the platform. Certain aspects of the disclosure reflect an appreciation that to mitigate the desense issue, high antenna isolation between radios may be desirable. Physically separating the two antennas is the best way to increase isolation. However, with certain systems such as thin and light systems, this is usually not an option due to industrial design constraints. Certain aspects of the disclosure reflect an appreciation that to prevent these radios from desensing each other, wideband high isolation is desirable.

A system and method for providing an antenna structure that traps a traveling current from one antenna to the other resulting in high antenna isolation. It will be appreciated that such an antenna structure accomplishes this antenna isolation without sacrificing antenna radiation efficiency and bandwidth. In certain embodiments, the antenna structure includes a cascade of open and short impedance circuits. In certain embodiments, the cascade of open and short impedance circuits is configured for specific frequencies. In certain embodiments, the cascade of open and short impedance circuits are used to increase notch bandwidth with high Q characteristic to achieve higher and wider rejection performance in RF circuit design.

In certain embodiments, the antenna structure uses an equivalent open and short impedance structure which performs a current trapper function. In certain embodiments, the equivalent open and short impedance structure is instantiated within a printed circuit board. In certain embodiments, the open and short impedance structure is printed along an edge of a printed circuit board. In certain embodiments, the open and short impedance structure is etched on a copper layer of a printed circuit board of the platform. In certain embodiments, the open and short impedance structure prevents the circulating current from one radio's antenna to the other radio's antenna.

Such an antenna structure results in higher and wider isolation characteristics between the antennas, thus enabling true dual radio operation in an ultra-compact form factor. Additionally, such an antenna structure does not impact antenna volume and cost as the structure is etched on a printed circuit board copper layer.

In certain embodiments, the multi radio platform comprises a multi radio docking station. In certain embodiments, the multi radio docking station enables two wireless connection paths. In certain embodiments, the two wireless connection paths of the multi radio docking station provide a fronthaul radio that connects to the docking station to a portable type information handling system and a backhaul radio that connects docking station to an access point. In certain embodiments, both radios of the multi radio docking station support 802.11 ac/ax. In certain embodiments, the multi radio docking station is compactly sized. In certain embodiments, antennas for both radios are placed on a single antenna carrier and are close to each other.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
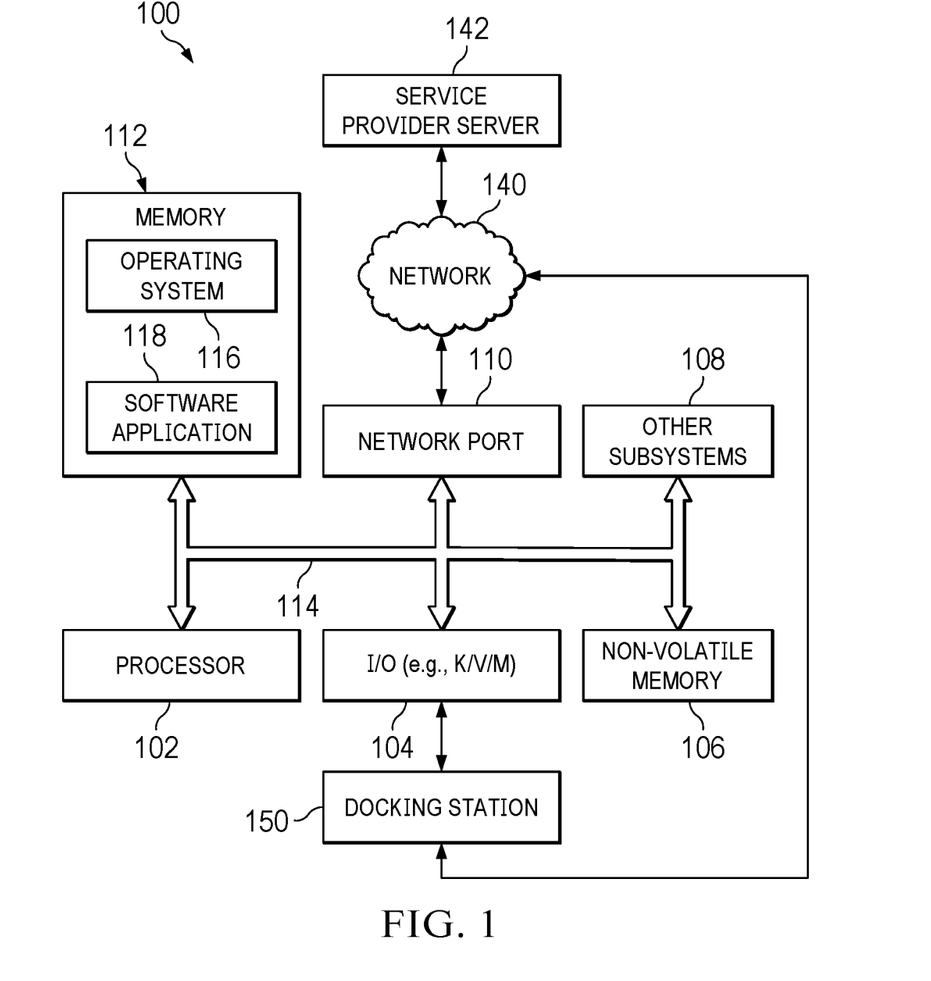
FIG. 1 shows a general illustration of components of an information handling system as implemented in the system and method of the present disclosure.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a software application 118. In one embodiment, the information handling system 100 is able to download the software application 118, from the service provider server 142. In another embodiment, the functionality provided by the software application 118 may be provided as a service from the service provider server 142.

In certain embodiments, the information handling system may further include a docking station 150. In certain embodiments, the docking station 150 may be directly coupled (e.g., via a cable) to the information handing system, e.g., via one or more I/O devices 104. In certain embodiments, the network port 110 includes wireless communication functionality. In certain embodiments, the docking station 150 may be wirelessly coupled with the information handling system, e.g., via the wireless functionality of the network port 110.

As used herein, a docking station broadly refers to a device that allows a mobile type information handling system to function as a desktop type information handling system. In certain embodiments, a docking station, such as docking station 150 allows a mobile type information handling system to substantially simultaneously connect to one or more of a plurality of components. In certain embodiments, the plurality of components include one or more of a display device, a printer, one or more I/O devices such as a keyboard and mouse, external storage, a backup drive and a network such as a local area network. In certain embodiments, a docking station may itself be considered an information handling system as the docking station includes its own respective processor and memory.

In certain embodiments a docking station, such as docking station 150 includes a plurality of ports to allow for the direct connection (i.e., via respective cables) between the docking station and the plurality of components. In certain embodiments a docking station, such as docking station 150 includes a port to allow for the direct connection (i.e., via a respective cable) between the docking station and the information handling system. In certain embodiments, a docking station, such as docking station 150, includes wireless functionality. In certain embodiments, the wireless functionality enables a wireless connection between the docking station and the information handling system. In certain the wireless functionality enables a wireless connection between the docking station and a network. In certain the wireless functionality enables a substantially simultaneous wireless connection between the docking station and the information handling system and between the docking station and a network. In certain embodiments, the wireless functionality includes multi radio functionality to enable the substantially simultaneous wireless connection between the docking station and the information handling system and between the docking station and a network.

Figure 2:
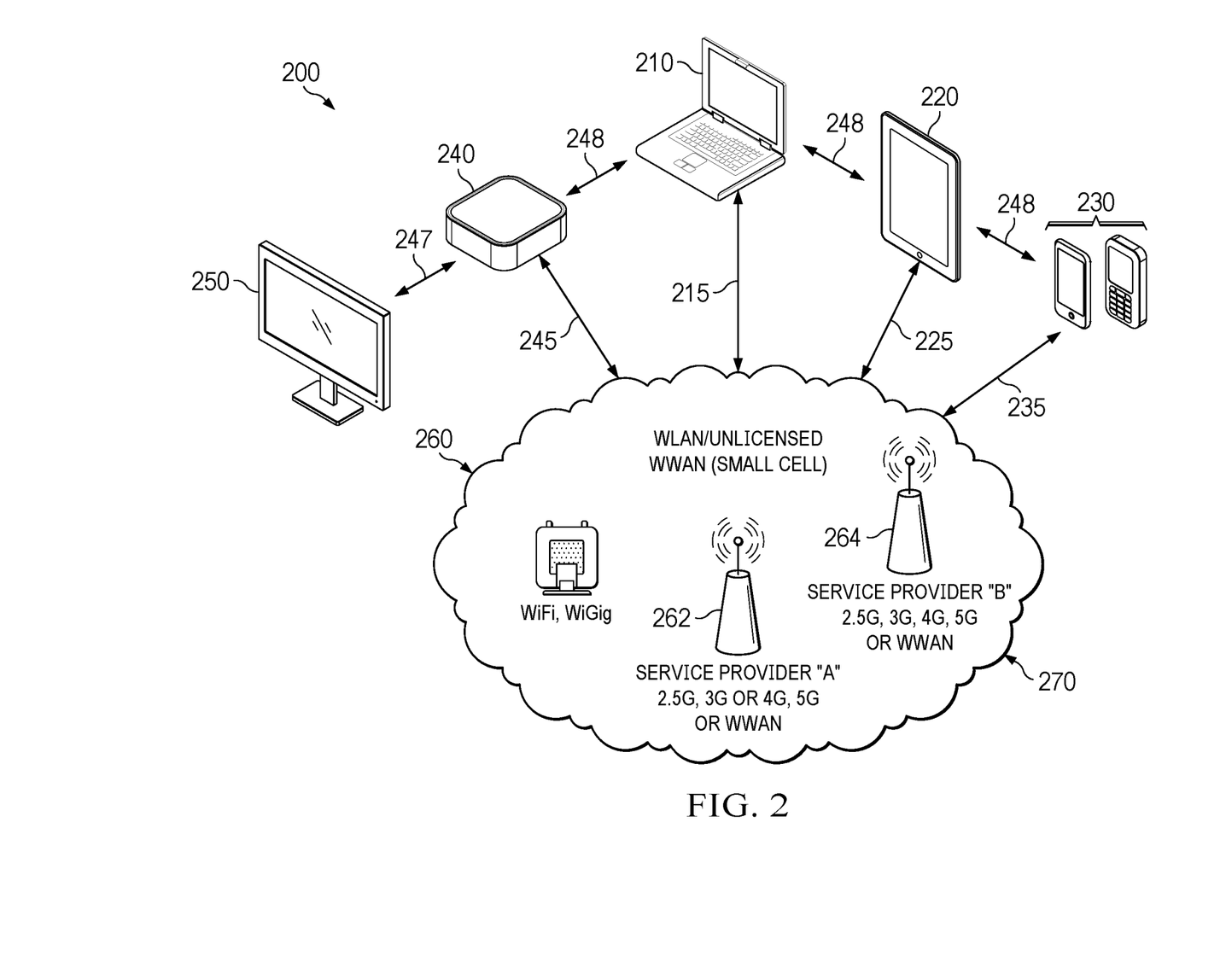
FIG. 2 shows a block diagram of a network environment offering several communication protocol options and mobile information handling systems according to an embodiment of the present disclosure.

FIG. 2 shows a network 200 that can include one or more information handling systems 210, 220, 230. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree Convertible systems, wearable computing devices, or a smart phone device. In certain embodiments, one or more of systems 210, 220, and 230 may communicate with a docking station 240. In certain embodiments, the communication may be via a direct connection 248 or a wireless connection (e.g., via 215 and 245). In certain embodiments, the docking station 240 is coupled with I/O devices such as monitor 250 e.g., via 247).

These mobile information handling systems 210, 220, and 230, may access a wireless local network 260, or they may access a macro-cellular network 270. For example, the wireless local network 260 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local network 260 may be via standard protocols such as IEEE 802.11 Wi-Fi, IEEE 802.11ad WiGig, IEEE 802.15 WPAN, IEEE 802.11, IEEE 1914/1904, IEEE P2413/1471/42010, or 5G small cell WWAN communications such as eNodeB, or similar wireless network protocols. Alternatively, other available wireless links within network 200 may include macro-cellular connections 270 via one or more service providers 262 and 264. Service provider macro-cellular connections may include 2G standards such as GSM, 2.5G standards such as GSM EDGE and GPRS, 3G standards such as W-CDMA/UMTS and CDMA 2000, 4G standards, or 5G standards including GSM, GPRS, EDGE, UMTS, IMS, WiMAX, LTE, and LTE Advanced, LTE-LAA, small cell WWAN, and the like.

Wireless local network 260 and macro-cellular network 270 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands that may be subject to sharing include 2.4 GHz, 70 GHz, 900 MHz or similar bands as understood by those of skill in the art. Within local portion of wireless network 270 access points for Wi-Fi or WiGig as well as small cell WWAN connectivity may be available in emerging 5G technology such as high frequency (HF) band, very high frequency (VHF) band, ultra-high frequency (VHF) band, L band, S band, C band, X band, Ku band, K band, Ka band, V band, W band, and millimeter wave bands. This may create situations where a plurality of antenna systems are operating on a mobile information handling system 210, 220 or 230 via concurrent communication wireless links on both WLAN and WWAN and which may operate within the same, adjacent, or otherwise interfering communication frequency bands. The antenna may be a transmitting antenna that includes high-band, medium-band, low-band, and unlicensed band transmitting antennas. Alternatively, embodiments may include a single transceiving antenna capable of receiving and transmitting, and/or more than one transceiving antenna. Each of the antennas included in the information handling system 100 in an embodiment may be subject to the FCC regulations on specific absorption rate (SAR). The antenna in the embodiments described herein is an aperture antenna intended for efficient use of space within a metal chassis of an information handling system. Aperture antennas in embodiments of the present disclosure may be an effective improvement on wireless antennas employed in previous information handling systems.

The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 262 and 264.

Although 215, 225, and 235 are shown connecting wireless adapters of mobile information handling systems 210, 220, and 230 to wireless networks 260 or 270, a variety of wireless links are contemplated. Wireless communication may link through a wireless access point (Wi-Fi or WiGig), through unlicensed WWAN small cell base stations such as in network 260 or through a service provider tower such as that shown with service provider A 262 or service provider B 264 and in network 270. In other aspects, mobile information handling systems 210, 220, and 230 may communicate intra-device via 248 when one or more of the mobile information handling systems 210, 220, and 230 are set to act as an access point or even potentially a WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3:
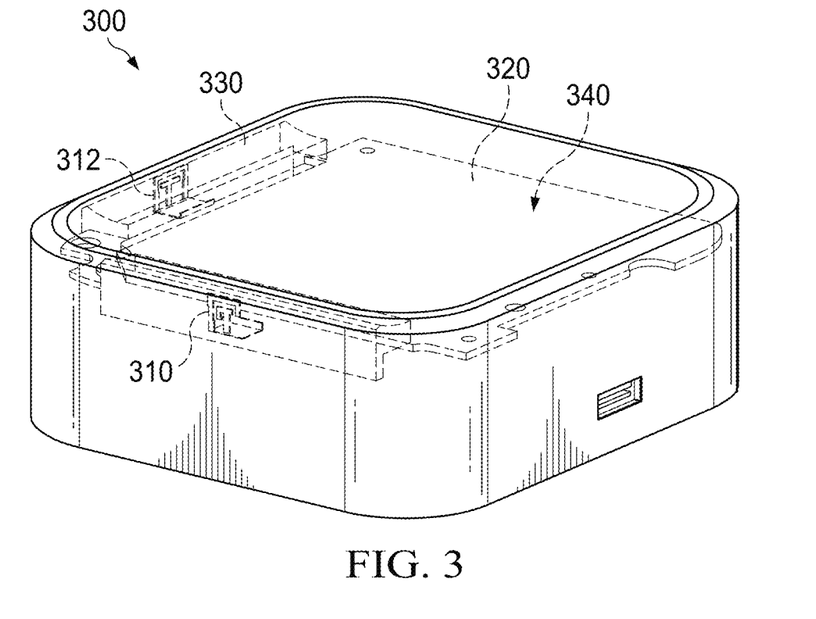
FIG. 3 shows a perspective view of an information handling system docking station according to an embodiment of the present disclosure.

FIG. 3 shows a perspective view of an information handling system docking station 300 according to an embodiment of the present disclosure. In certain embodiments, the information handling system docking station 300 comprises a multi radio docking station. In certain embodiments, the multi radio docking station enables simultaneous communication via two wireless connection paths. In certain embodiments, the two wireless connection paths of the multi radio docking station provide a fronthaul radio that connects the docking station 300 to a portable type information handling system and a backhaul radio that connects docking station to an access point. In certain embodiments, both radios of the multi radio docking station support 802.11 ac/ax. In certain embodiments, the multi radio docking station is compactly sized. In certain embodiments, compactly sized refers to a docking station having dimensions substantially (i.e., +/−20%) less than 120 mm×120 mm×50 mm. In certain embodiments, the multi radio docking station is sized as substantially (i.e., +/−20%) 118 mm×118 mm×49 mm. In certain embodiments, antennas for both radios are placed on a single antenna carrier and are close to each other due to the compact size of the docking station.

In certain embodiments, the multi radio docking station includes a first antenna 310 positioned along a first edge of the docking station. In certain embodiments, the multi radio docking station includes a second antenna 312 positioned along a first edge of the docking station. In certain embodiments, the first antenna 310 and the second antenna 312 are substantially (e.g., +/−20%) perpendicular to one another. In certain embodiments, the first antenna 310 is associated with a first radio of the multi radio docking station and the second antenna 312 is associated with a second radio of the multi radio docking station. In certain embodiments, the first antenna 310 and the second antenna 312 are mounted to respective portions of an antenna carrier 320. In certain embodiments, the first antenna 310 and the second antenna 312 are coupled to an RF printed circuit board 330. In certain embodiments, the first antenna 310, the second antenna 312, the antenna carrier 320 provide a multi radio antenna system 340.

Figure 4:
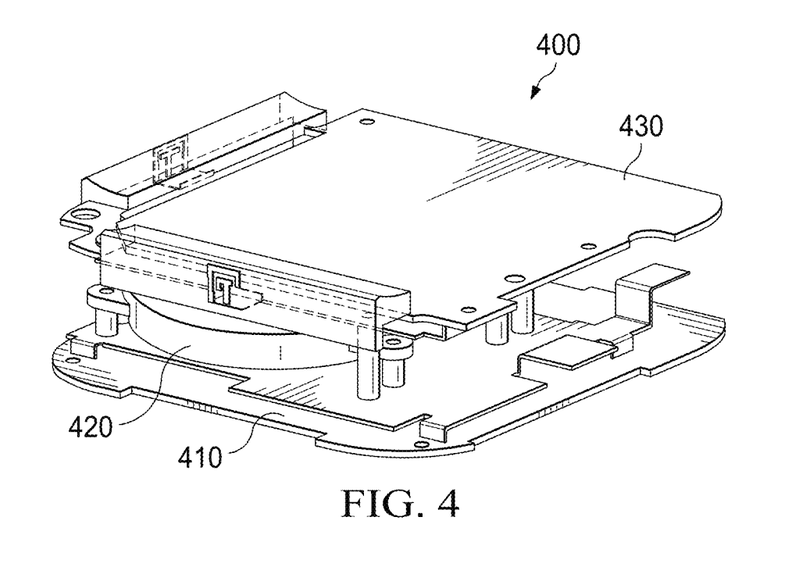
FIG. 4 shows a cut away perspective view of an information handling system docking station according to an embodiment of the present disclosure.

FIG. 4 shows a cut away perspective view of an information handling system docking station 400 according to an embodiment of the present disclosure. In certain embodiments, the docking station 400 includes an input/output (I/O) printed circuit board 410, a thermal component 420 and a radio frequency (RF) printed circuit board 430. In certain embodiments, the I/O printed circuit board includes components (e.g., one or more of a processor, memory and I/O controllers) to provide and control input and output communication functions for the docking station 400. In certain embodiments, the RF printed circuit board includes components (e.g., one or more of an RF controller, antenna connector and antenna signal isolation component) to provide and control radio frequency functions for the docking station 400. In certain embodiments, the thermal component 420 includes a fan to provide thermal dispersion functionality for the components contained within the docking station 400. In certain embodiments, an antenna system such as antenna system 340, is mounted to the RF printed circuit board 430.

Figure 5:
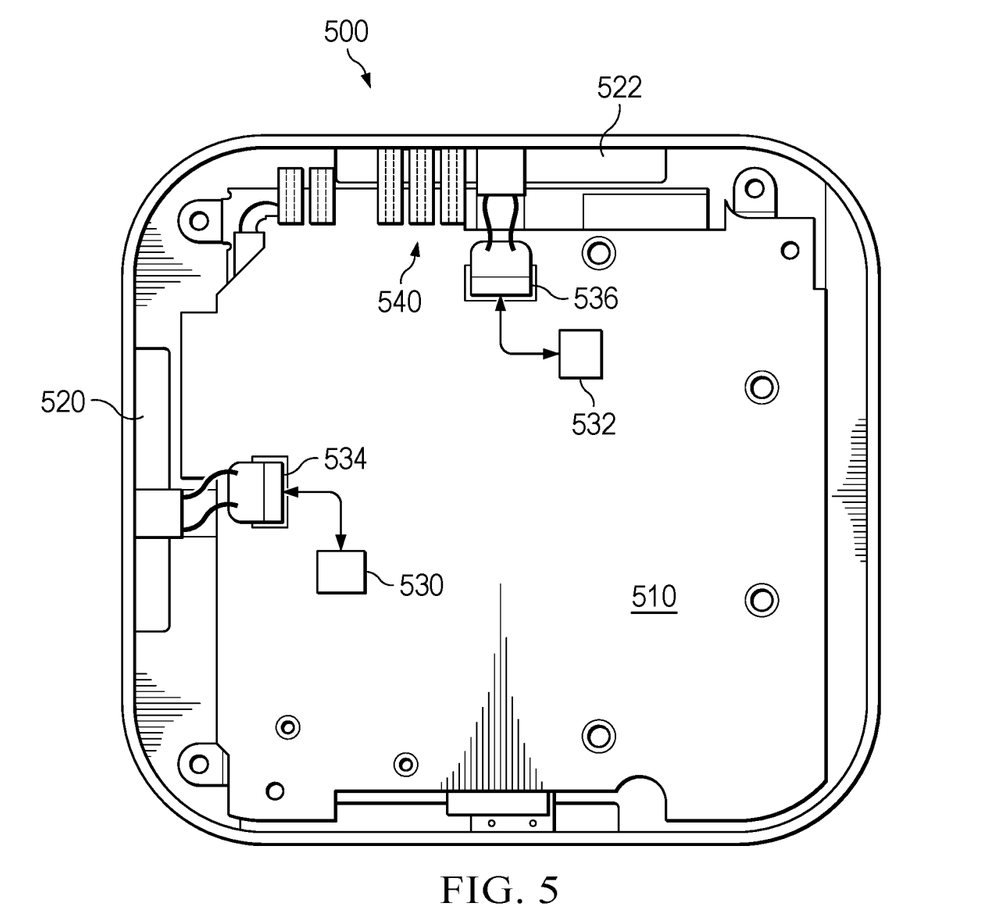
FIG. 5 shows a diagrammatic top view of an antenna structure of an information handling system docking station according to an embodiment of the present disclosure.

FIG. 5 shows a diagrammatic top view of an antenna structure 500 of an information handling system docking station according to an embodiment of the present disclosure. In certain embodiments, the antenna structure includes an RF printed circuit board 510 as well as a first antenna 520 (Ant1) and a second antenna 522 (Ant2).

In certain embodiments, the antenna structure includes a first antenna system controller 530 for controlling the first antenna 520 and a second antenna system controller 532 for controlling the second antenna 522. As will be appreciated, a single antenna system controller may be used to control the first antenna 520 and the second controller 522. In certain embodiments, the first antenna system controller 530 communicates with the first antenna 520 via the RF printed circuit board 510 and connector 534. In certain embodiments, the second antenna system controller 532 communicates with the second antenna 522 via the RF printed circuit board 510 and connector 536.

In certain embodiments, the antenna structure 500 includes an antenna signal isolation component 540. In certain embodiments, the antenna signal isolation component 540 traps a traveling current from the first antenna 520 to the second antenna 522 thus resulting in high antenna isolation. Such an antenna signal isolation component 540 accomplishes this antenna isolation without sacrificing antenna radiation efficiency and bandwidth. In certain embodiments, the antenna signal isolation component 540 performs a current trapper function. As used herein, a current trapper function broadly refers to an RF function which contains current generated by a first antenna so as to isolate an antenna signal generated by one antenna from receipt by another antenna. Such a current trapper function increases notch bandwidth with high Q characteristic to achieve higher and wider rejection performance for an associated antenna (e.g., antenna 522). Such a current trapper function addresses a desense issue when two antennas are proximate within a multi radio platform.

In certain embodiments, the antenna signal isolation component 540 traps a traveling current from one antenna to the other resulting in high antenna isolation. It will be appreciated that such an antenna signal isolation component 540 accomplishes this antenna isolation without sacrificing antenna radiation efficiency and bandwidth.

In certain embodiments, the antenna signal isolation component 540 includes a cascade of open and short impedance circuits. In certain embodiments, the cascade of open and short impedance circuits is configured for specific frequencies. In certain embodiments, the cascade of open and short impedance circuits are used to increase notch bandwidth with high Q characteristic to achieve higher and wider rejection performance in RF circuit design.

In certain embodiments, the antenna signal isolation component 540 uses an equivalent open and short impedance structure which performs a current trapper function. In certain embodiments, the equivalent open and short impedance structure is instantiated within a printed circuit board. In certain embodiments, the open and short impedance structure is printed along an edge of a printed circuit board. In certain embodiments, the open and short impedance structure is etched on a copper layer of a printed circuit board of the platform. In certain embodiments, the open and short impedance structure prevents the circulating current from one radio's antenna to the other radio's antenna.

Such an antenna structure results in higher and wider isolation characteristics between the antennas, thus enabling true dual radio operation in an ultra-compact form factor. Additionally, such an antenna structure does not impact antenna volume and cost as the structure is etched on a printed circuit board copper layer.

Figure 6:
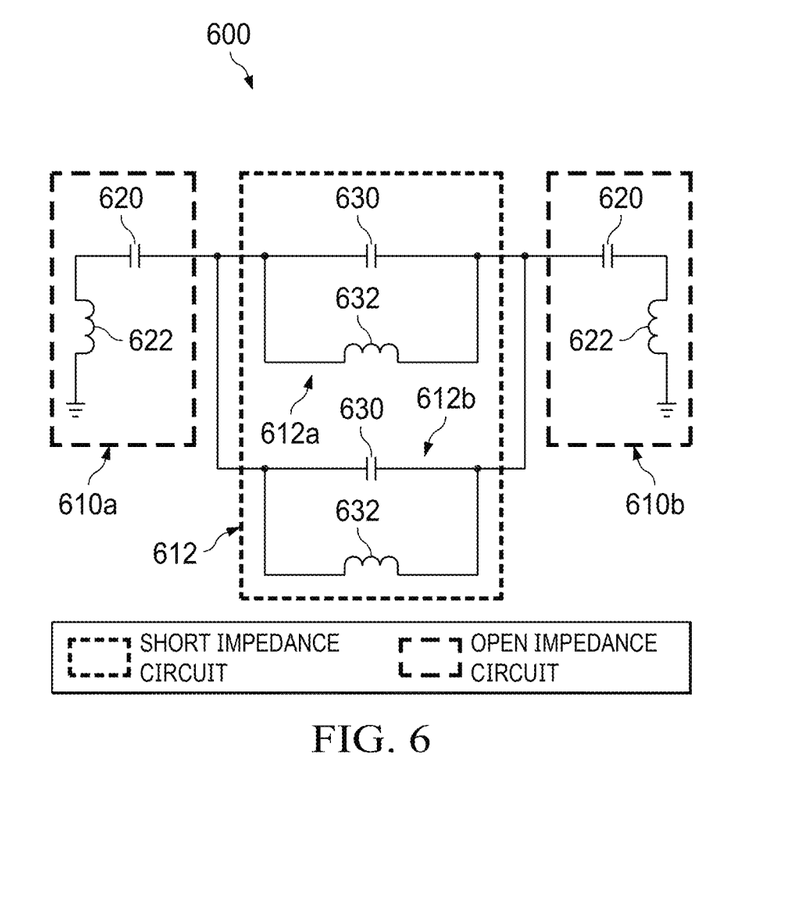
FIG. 6 shows a representation of a portion of a printed circuit board layout of an antenna structure of an information handling system docking station according to an embodiment of the present disclosure.

FIG. 6 shows a schematic representation of an antenna signal isolation circuit 600 of an antenna structure of an information handling system docking station according to an embodiment of the present disclosure. In certain embodiments, the antenna isolation circuit 600 traps a traveling current from one antenna to the other resulting in high antenna isolation. It will be appreciated that such an antenna isolation circuit 600 accomplishes this antenna isolation without sacrificing antenna radiation efficiency and bandwidth. In certain embodiments, the antenna isolation circuit 600 includes a cascade of open and short impedance circuits. In certain embodiments, the cascade of open and short impedance circuits is configured for specific frequencies. In certain embodiments, the cascade of open and short impedance circuits are used to increase notch bandwidth with high Q characteristic to achieve higher and wider rejection performance in RF circuit design. More specifically, in certain embodiments, the antenna signal isolation circuit 600 includes an open impendence circuit 610 and a short impedance circuit 612.

In certain embodiments, a portion of the antenna isolation circuit 600 includes two open impedance circuits 610a, 610b. In certain embodiments, one or both open impedance circuits 610a, 610b include a capacitor 620 and an inductor 622 coupled in series. In certain embodiments, the capacitor 620 and the inductor 622 are coupled in series between the short impedance circuit 612 and ground. In certain embodiments, the open impedance circuit 610 generates an impedance and a phase shift based upon the values of the capacitor 620 and the inductor 622. More specifically, the impedance and phase shift for the open impedance circuit is calculated as:

Impedance of L and C in Series $$Z = jwL + \frac{1}{jwC}, w = 2\pi f$$

$$|Z| = \left| wL - \frac{1}{wC} \right|$$

Phase Difference $$wL > \frac{1}{wC} \quad \Phi = 90$$

$$wL < \frac{1}{wC} \quad \Phi = -90$$

$$wL = \frac{1}{wC} \quad \Phi = 0$$

In certain embodiments, a portion of the antenna isolation circuit 600 includes two short impedance circuits 612a, 612b. In certain embodiments, one or both short impedance circuits 612a, 612b include a capacitor 630 and an inductor 632 coupled in parallel. In certain embodiments, the capacitor 630 and the inductor 632 are coupled in parallel between the open impedance circuit 610a and the open impedance circuit 610b. The short impedance circuit 612 generates an impedance and a phase shift based upon the values of the inductor and the capacitor. More specifically, the impedance and phase shift for the short impedance circuit 612 is calculated as:

Impedance of L and C in Parallel $$\frac{1}{Z} = \frac{1}{jwL} + jwC, w = 2\pi f$$

$$|Z| = \frac{1}{\left| \frac{1}{wL} - wC \right|}$$

Phase Difference $$\frac{1}{wL} > wC \quad \Phi = 90$$

$$\frac{1}{wL} < wC \quad \Phi = -90$$

$$\frac{1}{wL} = wC \quad \Phi = 0$$

Figure 7:
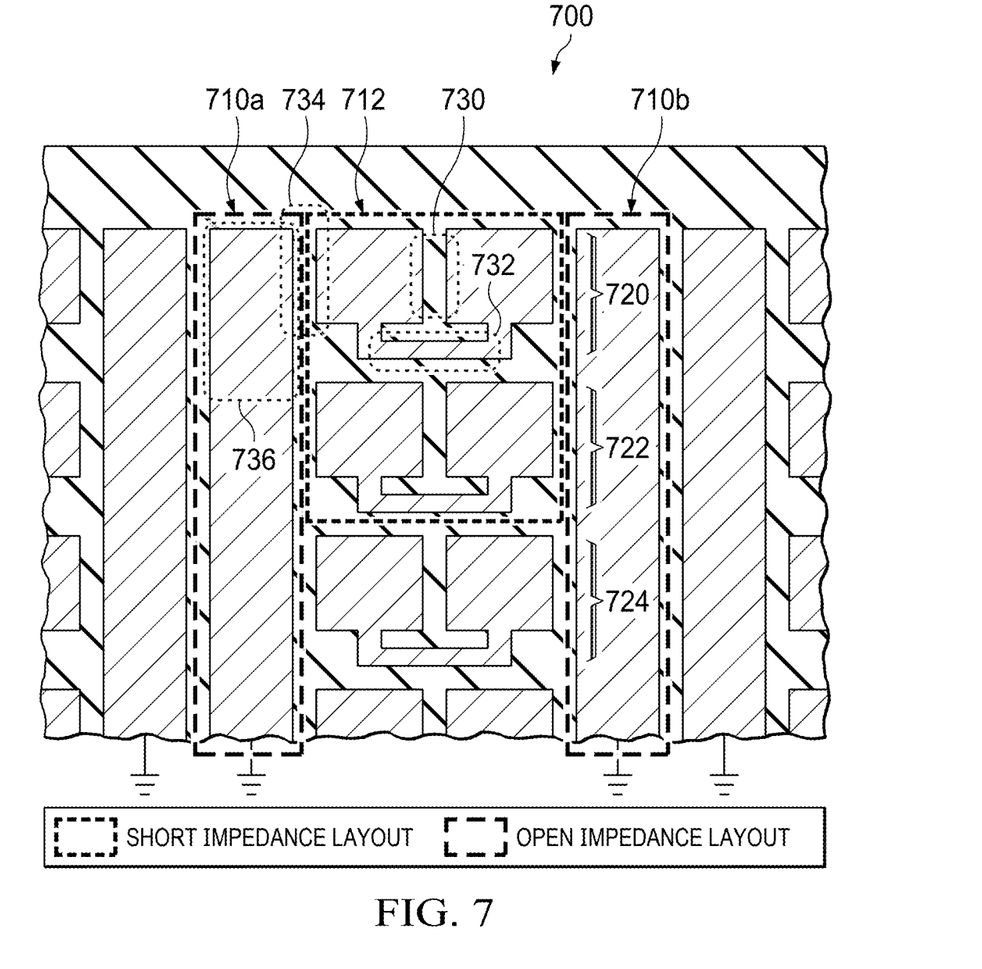
FIG. 7 shows a schematic representation of a portion of an antenna structure of an information handling system docking station according to an embodiment of the present disclosure.

FIG. 7 shows a representation of a portion of a printed circuit board antenna isolation layout 700 of an antenna structure of an information handling system docking station according to an embodiment of the present disclosure. In certain embodiments, various portions of the printed circuit board antenna isolation layout 700 correspond to the various components of the schematic representation of an antenna signal isolation circuit 600. For example, portions of the open impedance layout 710 correspond to respective circuits of the open impedance circuit 610. Portions of the short impedance layout 712 correspond to respective circuits of the short impedance circuit 612. In certain embodiments, the antenna isolation layout 700 is included within the RF printed circuit board of the multi radio docking station. In various embodiments, portions of the open impedance layout 710 provide the structure to perform the electrical function of respective circuits of the open impedance circuit 610. Portions of the short impedance layout 712 provide the structure to perform the electrical function of respective circuits of the short impedance circuit 612.

In certain embodiments, the antenna isolation layout 700 traps a traveling current from one antenna to the other resulting in high antenna isolation. It will be appreciated that such an antenna isolation layout 700 accomplishes this antenna isolation without sacrificing antenna radiation efficiency and bandwidth.

In certain embodiments, the antenna isolation layout 700 includes a cascade of open and short impedance layouts. In certain embodiments, the cascade of open and short impedance layouts is configured for specific frequencies. In certain embodiments, the cascade of open and short impedance layouts is used to increase notch bandwidth with high Q characteristic to achieve higher and wider rejection performance in RF circuit design.

In certain embodiments, the antenna structure uses an equivalent open and short impedance structure which performs a current trapper function. In certain embodiments, the equivalent open and short impedance structure is instantiated within a printed circuit board. In certain embodiments, the open and short impedance structure is printed along an edge of a printed circuit board. In certain embodiments, the open and short impedance structure is etched on a copper layer of a printed circuit board of the platform. In certain embodiments, the open and short impedance structure prevents the circulating current from one radio's antenna to interfere with the other radio's antenna.

Such an antenna isolation layout results in higher and wider isolation characteristics between the antennas, thus enabling true dual radio operation in an ultra-compact form factor. Additionally, such an antenna isolation layout does not impact antenna volume and cost as the structure is etched on a printed circuit board copper layer.

In certain embodiments, the antenna isolation circuit is instantiated using the antenna isolation layout. In certain embodiments, the antenna isolation layout includes etched portions which perform electrical component functions. In certain embodiments, etched portion 730 performs an inductor function and etched portion 732 performs a capacitor function. In certain embodiments, etched portion 730 and etched portion 732 provide a short impedance structure which performs a function equivalent to short impedance circuit 612. In certain embodiments, etched portion 734 performs a capacitor function and etched portion 736 performs an inductor function. In certain embodiments, etched portion 734 and etched portion 736 provide an open impedance structure which performs a function equivalent to open impedance circuit 610.

In certain embodiments, the printed circuit board antenna isolation layout 700 may be cascaded with a plurality of respective layouts. For example, a plurality of printed circuit board antenna isolation layouts 700 may be arranged vertically to provide a plurality of short impedance circuits 612. In certain embodiments, two printed circuit board layouts 700 may be provided to provide a total of six short impedance circuits. In certain embodiments, the open impedance circuits extend vertically across the plurality of short impedance circuits.

In certain embodiments, a plurality of printed circuit board layouts 700 may be arranged horizontally to provide a plurality of open impedance circuits 610 with intervening short impedance circuits 612. In certain embodiments, three printed circuit board layouts 700 may be provided to provide a total of six open impedance circuits with nine intervening short impendence circuits 612. In certain embodiments, a plurality of printed circuit board layouts 700 may be arranged vertically and horizontally. In certain embodiments, six printed circuit board layouts 700 may be provided to provide a total of six open impedance circuits with eighteen intervening short impendence circuits 612.

Figure 8:
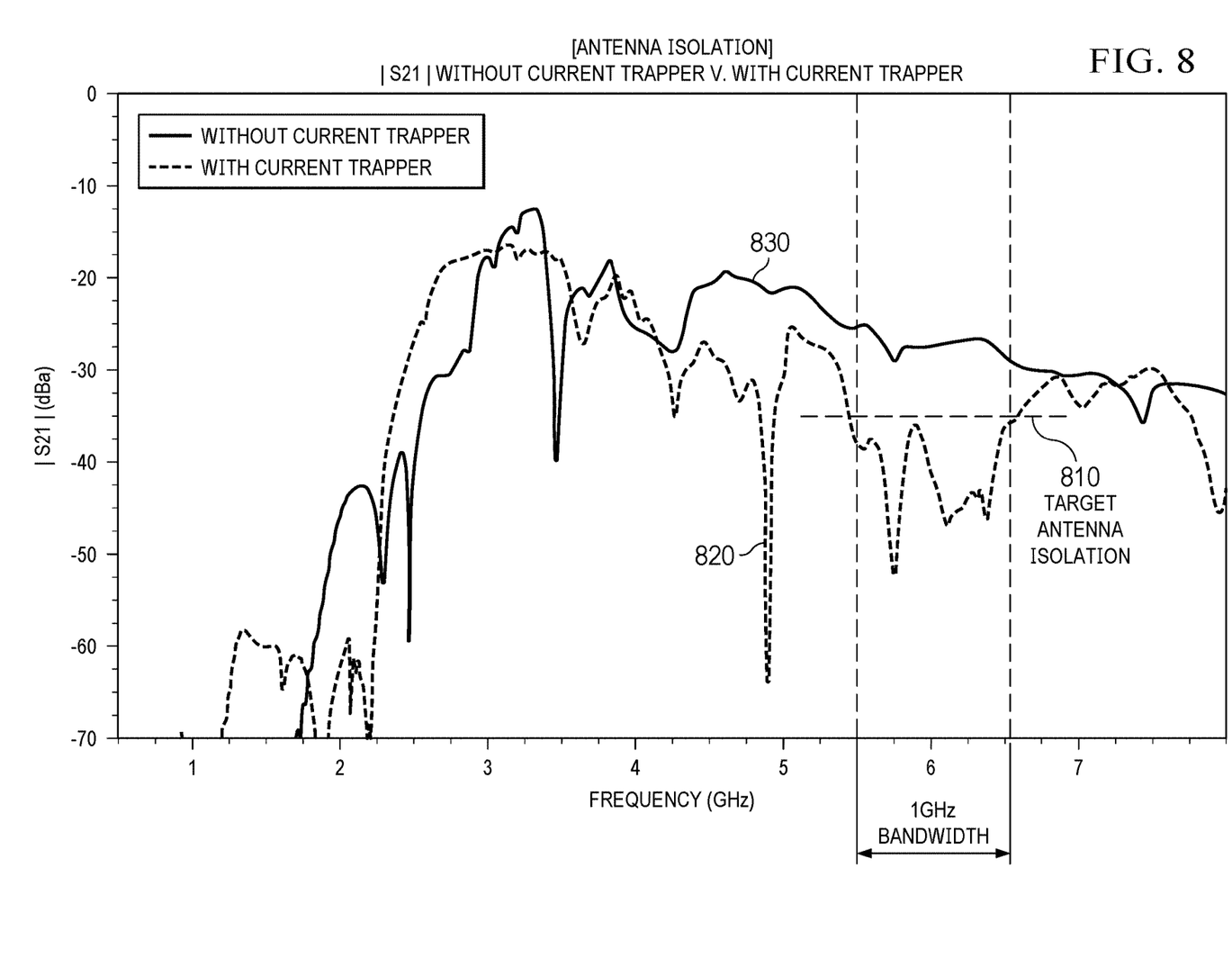
FIG. 8 shows an example antenna isolation graph result of application of an antenna structure of an information handling system docking station according to an embodiment of the present disclosure.

FIG. 8 shows an example antenna isolation graph result of application of an antenna structure of an information handling system docking station according to an embodiment of the present disclosure. More specifically, a target antenna isolation 810 in a 1 GHz range from 5.5 GHz to 6.5 GHz is achieved via use of an antenna isolation component as shown by the plot generated using an antenna isolation component according to the present disclosure (see e.g., 820) when compared to the plot generated when an antenna isolation component is not sued (see e.g., 830).

Figure 9:
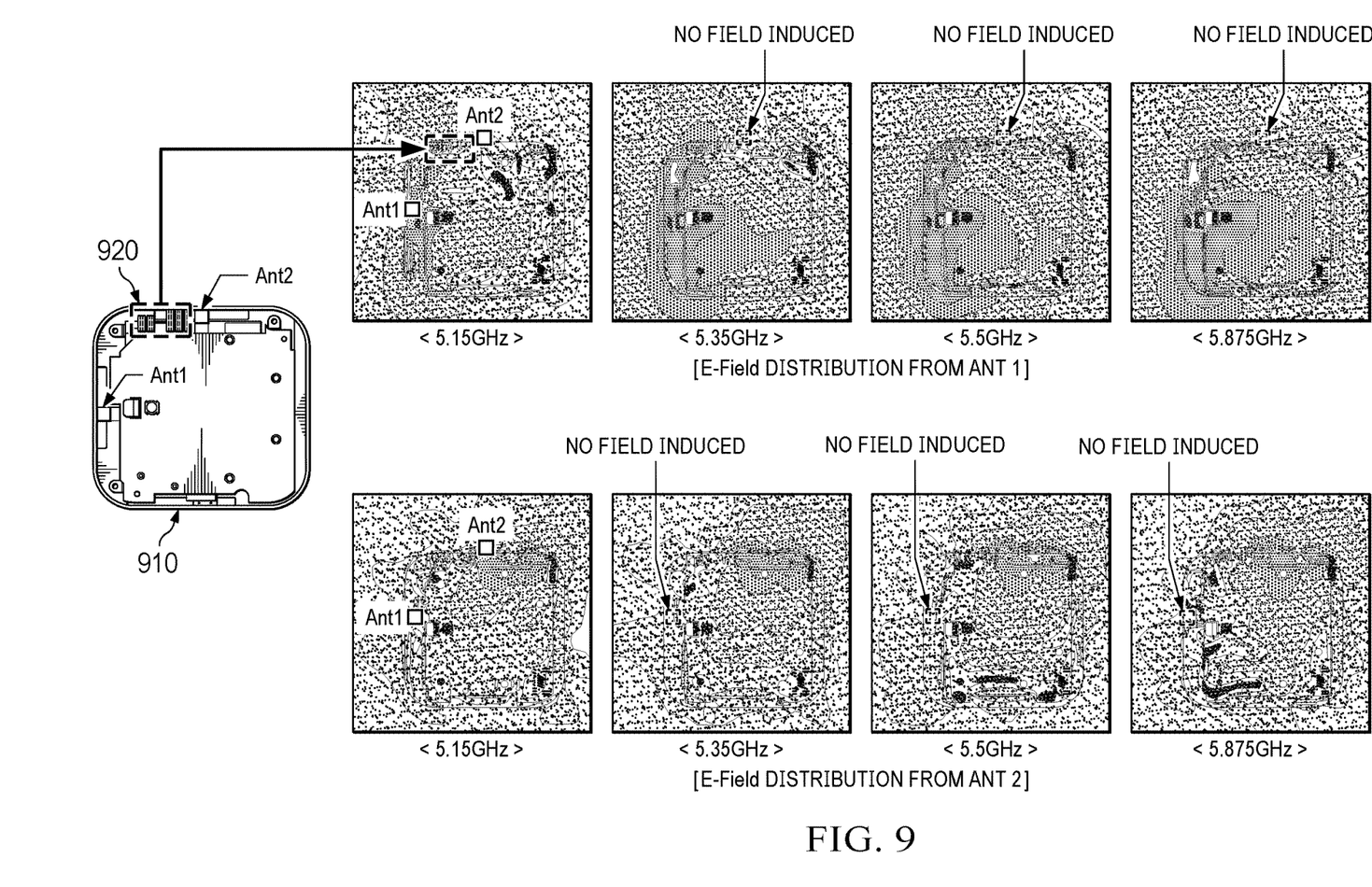
FIG. 9 shows example results of an E field distribution for an antenna structure of an information handling system docking station according to an embodiment of the present disclosure.

FIG. 9 shows example results of an E field distribution for an antenna structure of an information handling system docking station according to an embodiment of the present disclosure. More specifically, FIG. 9 shows the E field distributions for a first antenna (Ant1) and a second antenna (Ant2) for an example docking station 910 which includes an antenna isolation component 920.

Other embodiments are within the following claims. For example, referring to FIG. 10, an antenna isolation component 1010 may include one or both of a first cascaded antenna isolation layout 1020 and a second cascaded antenna isolation layout 1022. In certain embodiments, each of the first cascaded antenna isolation layout 1020 and the second cascaded antenna isolation layout 1022 include a plurality of printed circuit board layouts (such as printed circuit board layout 700). In certain embodiments the printed circuit board layouts may be arranged horizontally to provide a plurality of open impedance circuits with intervening short impedance circuits. In certain embodiments, a plurality of printed circuit board layouts may be arranged vertically and horizontally.

Figure 10:
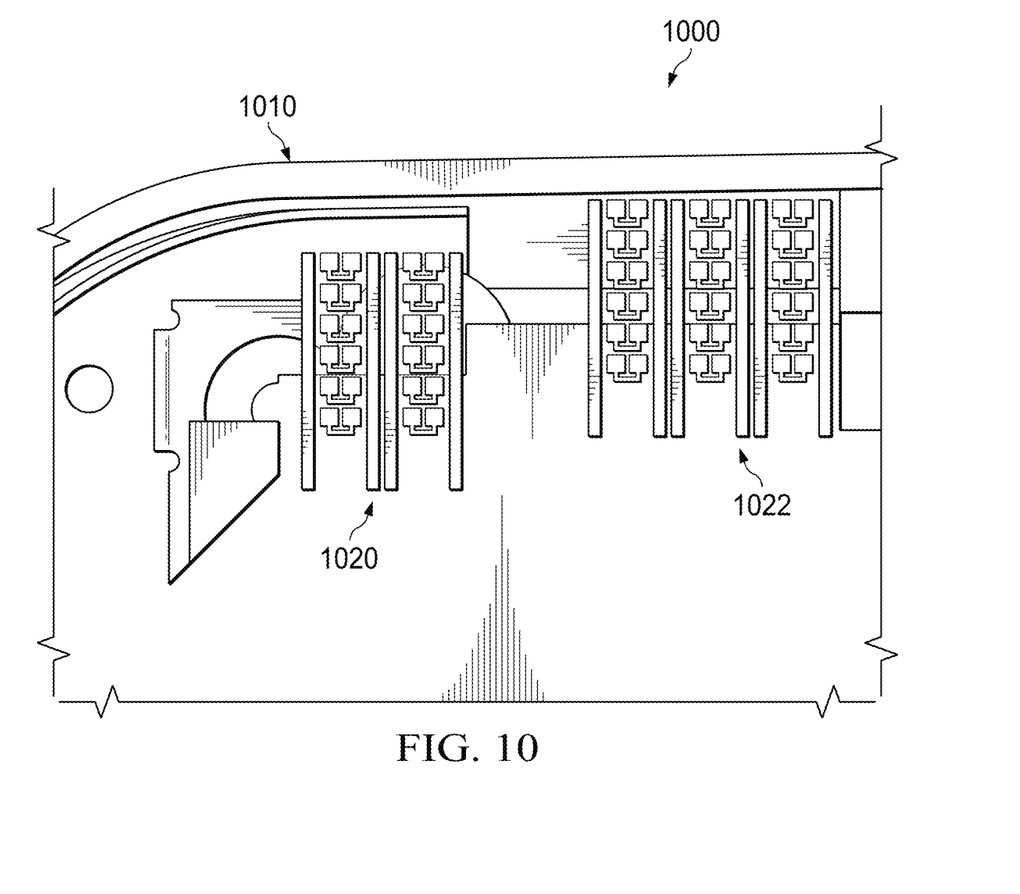
FIG. 10 shows a representation of a portion of a printed circuit board layout of an antenna structure of an information handling system docking station according to an embodiment of the present disclosure.

In certain embodiments, the first cascaded antenna isolation layout 1020 includes three printed circuit board layouts to provide a total of six open impedance circuits with nine intervening short impendence circuits. In certain embodiments, a plurality of printed circuit board layouts may be arranged vertically and horizontally. In certain embodiments, three vertical printed circuit board layouts may be provided to provide a total of six open impedance circuits with eighteen intervening short impendence circuits.

In certain embodiments, the second cascaded antenna isolation layout 1022 includes two printed circuit board layouts may be provided to provide a total of four open impedance circuits with four intervening short impendence circuits. In certain embodiments, a plurality of printed circuit board layouts may be arranged vertically and horizontally. In certain embodiments, two vertical printed circuit board layouts may be provided to provide a total of four open impedance circuits with twelve intervening short impendence circuits.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. An apparatus for performing a current trapper function, comprising:
   a short impedance structure, the short impedance structure comprising a first short impedance circuit and a second short impedance circuit, the first short impedance circuit generating a first impedance and phase shift, the second short impedance circuit generating a second impedance and phase shift;
   a first open impedance structure, the first open impedance structure being coupled between the short impedance structure and ground; and,
   a second open impedance structure, the second open impedance structure being coupled between the short impedance structure and ground, the short impedance structure being coupled between the first open impedance structure and the second open impedance structure; and wherein
the first short impedance circuit and the second short impedance circuit each comprise a short impedance capacitor structure and a short impedance inductor structure; and,
the short impedance capacitor structure and the short impedance inductor structure of the first short impedance circuit and the short impedance capacitor structure and the short impedance inductor structure of the second short impedance circuit are coupled in parallel between the first open impedance structure and the second open impedance structure.

2. The apparatus of claim 1, wherein:
at least one of the first open impedance structure and the second open impedance structure comprise an open impedance capacitor structure and an open impedance circuit inductor structure;
the open impedance capacitor structure and the open impedance inductor structure being coupled in series.

3. The apparatus of claim 1, further comprising:
a cascade of open impedance structures and short impedance structures.

4. The apparatus of claim 3, wherein:
the cascade of open impedance structures and short impedance structures are instantiated using a printed circuit board layout.

5. The apparatus of claim 4, wherein:
the printed circuit board layout includes etched portions corresponding to the short impedance structure, the first open impedance structure and the second short impedance structure.

6. An antenna system comprising:
a first antenna;
a second antenna; and
an antenna isolation component positioned proximate to one of the first antenna and the second antenna, the antenna isolation component performing a current trapper function, the antenna isolation component comprising:
a short impedance structure, the short impedance structure comprising a first short impedance circuit and a second short impedance circuit, the first short impedance circuit generating a first impedance and phase shift, the second short impedance circuit generating a second impedance and phase shift;
a first open impedance structure, the first open impedance structure being coupled between the short impedance structure and ground; and,
a second open impedance structure, the second open impedance structure being coupled between the short impedance structure and ground, the short impedance structure being coupled between the first open impedance structure and the second open impedance structure; and wherein
the first short impedance circuit and the second short impedance circuit each comprise a short impedance capacitor structure and a short impedance inductor structure; and,
the short impedance capacitor structure and the short impedance inductor structure of the first short impedance circuit and the short impedance capacitor structure and the short impedance inductor structure of the second short impedance circuit are coupled in parallel between the first open impedance structure and the second open impedance structure.

7. The system of claim 6, wherein:
at least one of the first open impedance structure and the second open impedance structure comprise an open impedance capacitor structure and an open impedance circuit inductor structure;
the open impedance capacitor structure and the open impedance inductor structure being coupled in series.

8. The system of claim 6, wherein the antenna isolation component comprises:
a cascade of open impedance structures and short impedance structures.

9. The system of claim 8, wherein:
the cascade of open impedance structures and short impedance structures are instantiated using a printed circuit board layout.

10. The system of claim 6, wherein:
the printed circuit board layout includes etched portions corresponding to the short impedance structure, the first open impedance structure and the second short impedance structure.

11. A multi radio docking station comprising:
a docking station housing;
a first antenna positioned within the docking station housing;
a second antenna positioned within the docking station housing; and
an antenna isolation component positioned proximate to one of the first antenna and the second antenna, the antenna isolation component performing a current trapper function, the antenna isolation component comprising:
a short impedance structure, the short impedance structure comprising a first short impedance circuit and a second short impedance circuit, the first short impedance circuit generating a first impedance and phase shift, the second short impedance circuit generating a second impedance and phase shift;
a first open impedance structure, the first open impedance structure being coupled between the short impedance structure and ground; and,
a second open impedance structure, the second open impedance structure being coupled between the short impedance structure and ground, the short impedance structure being coupled between the first open impedance structure and the second open impedance structure; and wherein
the first short impedance circuit and the second short impedance circuit each comprise a short impedance capacitor structure and a short impedance inductor structure; and,
the short impedance capacitor structure and the short impedance inductor structure of the first short impedance circuit and the short impedance capacitor structure and the short impedance inductor structure of the second short impedance circuit are coupled in parallel between the first open impedance structure and the second open impedance structure.

12. The multi radio docking station of claim 11, wherein:
at least one of the first open impedance structure and the second open impedance structure comprise an open impedance capacitor structure and an open impedance circuit inductor structure;
the open impedance capacitor structure and the open impedance inductor structure being coupled in series.

13. The multi radio docking station of claim 11, wherein the antenna isolation component comprises:

a cascade of open impedance structures and short impedance structures.

14. The multi radio docking station of claim 13, wherein:
the cascade of open impedance structures and short impedance structures are instantiated using a printed circuit board layout.

15. The multi radio docking station of claim 11, wherein:
the printed circuit board layout includes etched portions corresponding to the short impedance structure, the first open impedance structure and the second short impedance structure.

* * * * *